US010156605B2

(12) United States Patent
Pan et al.

(10) Patent No.: US 10,156,605 B2
(45) Date of Patent: Dec. 18, 2018

(54) ADDRESSABLE RING OSCILLATOR TEST CHIP

(71) Applicant: Semitronix Corporation, Hangzhou (CN)

(72) Inventors: Weiwei Pan, Hangzhou (CN); Yongli Liu, Hangzhou (CN); Xu Ouyang, Hangzhou (CN); Yongjun Zheng, Hangzhou (CN); Zheng Shi, Hangzhou (CN); Lili Li, Hangzhou (CN)

(73) Assignee: Semitronix Corporation, Hangzhou (JP)

( * ) Notice: Subject to any disclaimer, the term of this patent is extended or adjusted under 35 U.S.C. 154(b) by 630 days.

(21) Appl. No.: 14/831,556

(22) Filed: Aug. 20, 2015

(65) Prior Publication Data
US 2016/0061895 A1 Mar. 3, 2016

(30) Foreign Application Priority Data

Aug. 29, 2014 (CN) .......................... 2014 1 0437495
Aug. 29, 2014 (CN) .......................... 2014 1 0438969

(51) Int. Cl.
*G01R 31/317* (2006.01)
*H03K 3/03* (2006.01)
*G06F 17/50* (2006.01)

(52) U.S. Cl.
CPC ... *G01R 31/31725* (2013.01); *G06F 17/5072* (2013.01); *H03K 3/0315* (2013.01)

(58) Field of Classification Search
CPC .............. G01R 31/2851; G01R 31/317; G01R 31/31725
See application file for complete search history.

(56) References Cited

U.S. PATENT DOCUMENTS

2013/0021107 A1* 1/2013 Poppe .................. H03K 3/0315
 331/57
2014/0184262 A1* 7/2014 Poindexter ......... G01R 31/2853
 324/759.03

* cited by examiner

*Primary Examiner* — Jeffrey Shin
(74) *Attorney, Agent, or Firm* — Syncoda LLC; Feng Ma; Junjie Feng

(57) ABSTRACT

An addressable ring oscillator test chip includes: a plurality of ring oscillator test units, and a peripheral structure including peripheral circuits and PADs. The peripheral circuits share a first power source and a first grounding. Each test unit is associated with an independent power source to thereby decrease voltage drop resulting from wiring and to reduce the influence from other test units. A method of generating a variety of ring oscillators includes: generating a cell template corresponding to a basic unit, including defining a parameterized cell template; generating a ring oscillator based on the cell template, including generating ring oscillators of different stages by selecting different parameters of the cell template; realizing internal connections of the ring oscillator; and generating an instantiated ring oscillator by replacing cell templates with corresponding basic units.

18 Claims, 18 Drawing Sheets

US 10,156,605 B2

ADDRESSABLE RING OSCILLATOR TEST CHIP

CROSS-REFERENCE TO RELATED APPLICATIONS

The present application is a continuation of, and claims priorities respectively to Chinese Patent Application Nos. CN 201410437495.4 and CN 201410438969.7, both filed Aug. 29, 2014. The disclosures of the above applications are hereby incorporated by reference in their entirety.

BACKGROUND

Signal transmitting delay time is one of the important AC characteristics of CMOS integrated circuits. Integrating test structures into test chips, taping out and testing the test chips is a common method to test signal transmitting delays. As a result of the characteristics of the ring oscillator's structure, circuit signal transmitting time can be obtained by testing the oscillation frequency of the ring oscillator. Therefore, with the ever increasing integration level, ring oscillator test chips can be used to evaluate the characteristics of integrated circuit effectively. A large amount of test data about manufacture process and yield improvement can be achieved via large amount of tests of the test chips. As such, some valid solutions to improve the product yield and shorten the yield maturity period based on the test data can be realized. Designing test chip highly efficiently through computer-assisted methods has become an important research direction in the area of test chip designs.

SUMMARY

The present disclosure provides a type of novel addressable ring oscillator test chips, and a method to generate various ring oscillators. One can invoke the generated ring oscillators as test structures directly in the process of designing test chips. The type of novel addressable test chips not only have the capability of testing characteristics (such as oscillating periods, dynamic currents, direct currents, etc.) for each ring oscillator, but also can improve the chip area utilization ratio through approaches such as sharing PADs and tiled display of ring oscillators. Moreover, the test chip can save testing time because it does not need to move probes constantly to test each test structure.

The novel addressable test chip in the present disclosure includes a number of ring oscillator test units and a peripheral structure. The peripheral structure includes peripheral circuits and PADs, wherein the peripheral circuits share a pair of power source: the first power source and the first grounding. Each test unit is associated with a pair of independent power source: the second power source and the second grounding. In some implementations, the first power source and the first grounding are represented respectively by VDDC and GNDC, the second power source and the second grounding are represented respectively by VDDE and GNDE. Adopting independent power source for each test unit: on the one hand, making the distance as close as possible between the test unit and its power source to reduce voltage drop of wiring, so that the voltage applied on ring oscillator becomes more close to power source voltage; on the other hand, the independent power source is able to decease and avoid influence among test units.

In some implementations, said peripheral circuits of peripheral structure comprising: an addressing circuit, a signal transmission channel, a global frequency divider, a Driver. The Pads can be connection points of routing in test chips. Shared power source, plurality of independent power sources, input/output signals and address signals are provided by PADs. The Driver can be an I/O Driver.

In some implementations, the connection between each test unit and its independent power source adopts metal layers parallel networking routing. Compared with one metal layer routing, the metal layers parallel networking routing method has capable of minimizing wire resistance and improving test accuracy.

In some implementations, each test unit is placed between a pair of VDDC and GNDE PADs, and the test unit shares the VDDC and GNDE with its two adjacent neighboring test units. This placing rule can be defined as "nearest placing rule." The placing rule reduces the number of PADs and save area for test chips on the one hand, on the other hand, placing test unit and its power source as close as possible can reduce wire resistance and improve test accuracy. If the test unit is too big to be placed between its corresponding pair of independent power source VDDE and GNDE, one can also inobservance "nearest placing rule," as saving area is the main purpose of design test chip, this situation is rare.

In some implementations, in the addressable ring oscillator test chip, each test unit includes one or more test structures. The number of test structures in a test unit is in proportion to the addressing ability of addressing circuit. The addressing ability of addressing circuit is decided by addressing signal ports, each port have two type signal situations: 1 and 0. In some implementations, VDDE and GNDE control 4 test structures, it needs 2 addressing signal ports to supply $2^2$ addressing signals. In some implementations, VDDE and GNDE control 5/6/7/8 test structures, it needs 3 addressing signal ports to supply $2^3$ addressing signals. It can be seen that, n addressing signal ports can supply $2^n$ addressing signals for $\leq 2^n$ test structures.

In some implementations, one or more ring oscillator test structures in a test unit share a pair of power source VDDE and GNDE.

In some implementations, when a ring oscillator test structure is selected, the test structure belongs to a test unit, only a pair of independent power source VDDE and GNDE associated with the test unit works for the test structure, other independent power sources connecting ground. This method can reduce and avoid influence arisen from peripheral circuits, improve the stability of the test circuit.

In some implementations, in the addressable ring oscillator test chip, each ring oscillator test structure includes a ring oscillator, each ring oscillator can be associated with zero to a few local frequency dividers, if the oscillation frequency of one ring oscillator exceeds the transmission frequency range or the output frequency range of peripheral circuits, the ring oscillator may need to be associated with one or more local frequency dividers.

In some implementations, each ring oscillator test structure includes 6 ports: a pair of power source ports VDDE and GNDE to power ring oscillator, a pair of power source ports VDDC and GNDC to power partial frequency dividers, oscillation signal port EBL, oscillation output signal port OUT.

In some implementations, when a ring oscillator doesn't need to be configured partial frequency dividers or the configured partial frequency dividers share a pair of power source with the ring oscillator, each ring oscillator test structure includes 4 ports: a pair of power source ports VDDE and GNDE, oscillation signal port EBL, oscillation output signal port OUT.

In some implementations, the signal transmission channel of peripheral circuits includes signal input channel and signal output channel.

In some implementations, in a test unit, a ring oscillator test structure is selected by addressing circuit, the signal input channel inputs oscillation signal EBL by selector to the selected test structure, the unselected test structures are input static signal NEBL. The NEBL signals can avoid oscillation of the unselected ring oscillator test structures caused by spurious triggering, and improve the stability of test circuit effectively.

In some implementations, the signal output channel includes output channels inside test units and output channels between test units. The output channels inside test units make the outputs of unselected test structures are shielded by selectors, the oscillation frequency of selected test structure is output. For a test unit, the output channel between test units takes the output of the last level test unit as output 1, the output of the test unit as output 2, output 1 add up output 2 as the input of the next level test unit.

In another aspect, the present disclosure provides a test method using the addressable ring oscillator test chip. The test method includes: when peripheral circuits are supplied voltage, address signals can provide a set of addresses, and a set of control signals is generated by addressing circuit; a test unit is supplied power by power signals, in the test unit, the set of control signals allows a selected ring oscillator test structure's signal transmission channel on, input/output signal can be input/output; the input signal makes the selected ring oscillator test structure starts to oscillate, the unselected ring oscillator test structures always maintain in static state, so as to avoid oscillation of the unselected ring oscillator test structures caused by spurious triggering; oscillation frequency of the selected ring oscillator test structure is output by signal transmission channel; at last, the oscillation frequency is decreased by global frequency driver to the acceptable frequency range and output to an external tester.

In another aspect, this present disclosure provides a test system, which includes: one or more the addressable ring oscillator test chips. For example, the test system includes at least one addressable ring oscillator test chip and a tester; after oscillation frequency of the selected ring oscillator was output by using the addressable ring oscillator test chip, the oscillation frequency is output by PAD to a tester and tested via this tester.

The addressable ring oscillator test chips may have one or more of the following advantageous effects: 1) one or more ring oscillator test structures are placed into a test unit to share PADs, test units also can share PADs reciprocally. As such, the area utilization ratio is greatly improved, high area utilization ratio design meeting the requirement of high density IC circuits; 2) each test unit is associated with a pair of independent power source and the 'nearest placing rule' can reduce wire resistance between each test unit and its independent power source. The connection between each test unit and its independent power source adopts metal layers parallel networking routing to reduce wire resistance further. As such, the test accuracy is improved; 3) the independent power sources reduce and avoid the influence resulting from peripheral circuits, NEBL signals are used in signal transmission channel can avoid oscillation of the unselected ring oscillator test structures caused by spurious triggering, the stability of test circuit is improved effectively; 4) the number of PADs and partial frequency dividers can be design neatly, this design method not only saves area of test chips, but also makes circuits to be practical.

In the test chips design and measurement, test structures are the core of test chips, the saddressable ring oscillator test chips are no exception. Thousands ring oscillator test structures may be used in addressable ring oscillator test chip layout design, and the type of ring oscillator test structures are different. This present disclosure also provides a method and a system to generate various ring oscillators quickly to satisfy the requirement of ring oscillator test structures in layout design.

In another aspect, the present disclosure provides a method to generate various ring oscillators simply and quickly. The method can be used for the design of the ring oscillator test chips described above, or can be used to generate a variety of ring oscillators. The method can include: generating a cell template corresponding to a basic unit, generating a ring oscillator using the cell template, implementing the internal connection of the ring oscillator, ring oscillator instantiation. One can generate various ring oscillators by this method and use the generated ring oscillators as test structures to test chip design and other IC layout design.

Two types of basic units may be employed: 1) standard unit: gate circuits or modules with logic 'NOT' function which comprised by one or a more logic gates: inverter (NOT gate), AND gate, OR gate, NAND gate, NOR gate, XNOR gate, XOR gate, AND-OR-NOT gate; 2) nonstandard unit: gate circuits or modules with logic 'NOT' function which defined by user. It can be seen that there are many kind of basic units to constitute ring oscillator, various ring oscillators comprised by basic units have two situations: 1) the ring oscillators comprised by different kind of basic units, 2) the ring oscillators comprised by a kind of basic unit and a different number.

According to some embodiments, the present disclosure can use basic units to generate various ring oscillators simply and quickly by the following steps: a) Generating a cell template corresponding to a basic unit: defining a parameterized cell (PCell) template, defining the needed pins for the cell template, along with the corresponding search label of each pin. b) Generating a ring oscillator by the cell template: using the cell template generated in a) to replace the basic unit and to generate a ring oscillator. c) Implementing the internal connection of the ring oscillator: implementing the connection between cell templates or cell template and oscillation structure by path, and aligning the path by using constrains. d) Ring oscillator instantiation: using basic units to replace cell templates, and searching the corresponding pins based on the labels defined in a), in accordance to the location of the pins, using the definition of path from c) and the constraints to ensure the connections between pins.

In some implementations, before the step of ring oscillator instantiation, using parameterized cell template to replace the basic unit of ring oscillator, so as to realize the function of generating various ring oscillators flexibility.

In some implementations, before the step of ring oscillator instantiation, the cell template are defined as any kind of basic units, which kind of basic unit the cell template represented can be confirmed in the step of ring oscillator instantiation by user.

In some implementations, wherein the pins can be represented by any kind of polygons. For example, a rectangle can be commonly used.

In some implementations, in the step a), the needed pins of the cell template are defined by using one or more location templates (referred to as "Rect templates"). The Rect Template is used for the definition of pins in the cell template, it also be used to define the labels for each pin.

In some implementations, in the step b), the ring oscillators with different stages can be controlled by choosing different parameters, so as to generate one or more particular stages ring oscillators for user.

In some implementations, in the step c), wherein the path is a kind of basic layout structure for routing between pins.

In some implementations, in the step c), the oscillation structure is one part of ring oscillator. The oscillation structure is a gate circuit or module with logic 'NOT' function too, its type can be the same to the basic unit for instantiation, or different to the basic unit for instantiation, and its function in the ring oscillator is vibrating the ring oscillator. In the other words, ring oscillator can be comprised by 'N+1' basic units, 'N' is even and represents the number of a kind of basic unit, '1' represents a basic unit for oscillation.

In some implementations, in the step d), the basic unit is the basic unit available for user to comprise ring oscillator. This method can generate different type ring oscillators by using different basic units to replace cell template, so as to generate various ring oscillators with different basic components.

In some implementations, a plurality of the same kind of ring oscillators can be generated by copying or multiple calls.

In the process of generating ring oscillator, choosing different parameters of cell template can generate ring oscillators with different stages, choosing different basic units to replace cell templates can lead to generation of ring oscillators with different basic components. Therefore, the present disclosure realizes the flexible and reuse of parameterized cell, and provides a variety of ring oscillators to satisfy actual requirement by designing parameterized cell template only once. In practical applications, for the same kind of basic unit, if one needs to find the optimum size of basic unit to comprise ring oscillators, one can use this method to generate different ring oscillators with different size of basic units, so as to find the optimum size of basic unit.

In another aspect, the present disclosure also provides a computer software package, which includes computer instructions stored in non-temporary computer readable medium, which characterized in that, the software includes basic units and relevant steps to generate ring oscillators, using the stored basic unit to generate ring oscillator by using at least one computer to implement these steps, these instructions include: a) Generating a cell template corresponding to a basic unit: defining a parameterized cell template, defining the needed pins for the cell template, along with the corresponding search label of each pin. b) Generating a ring oscillator by the cell template: using the cell template generated in a) to replace the basic unit and to generate a ring oscillator. c) Implementing the internal connection of the ring oscillator: implementing the connection between cell templates or cell template and oscillation structure by path, and aligning the path by using constrains. d) Ring oscillator instantiation: using basic units to replace cell templates, and searching the corresponding pins based on the labels defined in a), in accordance to the location of the pins, using the definition of path from c) and the constraints to ensure the connections between pins.

In some embodiments, there are two types of basic unit included by the said computer software package: 1) standard unit: gate circuits or modules with logic 'NOT' function which comprised by one or a more logic gates: inverter (NOT gate), AND gate, OR gate, NAND gate, NOR gate, XNOR gate, XOR gate, AND-OR-NOT gate; 2) nonstandard unit: gate circuits or modules with logic 'NOT' function which defined by user.

In some embodiments, before the step of ring oscillator instantiation, the cell template is included in the said computer software package and is used to replace the basic unit of ring oscillator.

In some embodiments, before the step of ring oscillator instantiation, the cell template is included in the said computer software package, it just is a definition of a kind of basic unit, which kind of basic unit the cell template represented can be confirmed in the step of ring oscillator instantiation by user.

In some embodiments, in the step a) of the computer software package, the needed pins for the cell template are defined by using location template (Rect template).

In some embodiments, in the step b) of the computer software package, ring oscillators with different stages can be controlled by choosing different parameters, so as to generate particular stage ring oscillator for user.

In some embodiments, in the step c) of the computer software package, the path is a kind of basic layout structure for routing between pins.

In some embodiments, in the step d) of the computer software package, different type ring oscillators can be generated by using different basic units to replace cell templates.

In another aspect, this present disclosure also provides a system, characterized in that, the system includes at least one computer, the computer using the basic unit of ring oscillator to design and to generate various ring oscillators quickly, the system includes: a) Generating a cell template corresponding to a basic unit: defining a parameterized cell template, defining the needed pins for the cell template, along with the corresponding search label of each pin. b) Generating a ring oscillator by the cell template: using the cell template generated in a) to replace the basic unit and to generate a ring oscillator. c) Implementing the internal connection of the ring oscillator: implementing the connection between cell templates or cell template and oscillation structure by path, and aligning the path by using constrains. d) Ring oscillator instantiation: using basic units to replace cell templates, and searching the corresponding pins based on the labels defined in a), in accordance to the location of the pins, using the definition of path from c) and the constraints to ensure the connections between pins.

In some embodiments, in the above step c), the oscillation structure is one part of ring oscillator. The oscillation structure is a gate circuit or module with logic 'NOT' function too, its type can be the same to the basic unit for instantiation, or different to the basic unit for instantiation.

Using cell templates in the mass production of various ROs may have one or more of the following advantages: (1) when designing the (parameterized cell) PCell, if the required basic unit has not been completed, one can use the cell template instead for the subsequent design. Once the design of basic unit is completed, it can be used together with the Cell Template for instantiation; (2) to enable more flexibility of PCell design, one PCell can be instantiated using different basic units; (3) when the basic units are modified, instead of redesigning the PCells, one only needs to choose the basic units corresponding to the Cell Template for the instantiation of the new structure.

BRIEF DESCRIPTION OF THE DRAWINGS

FIG. 17-1 is a schematic diagram of an addressable ring oscillator test chip layout according to an embodiment; FIG. 17-2 is a schematic diagram of an addressable ring oscillator test chip layout according to another embodiment; FIG. 17-3 is a schematic diagram of an addressable ring oscillator test chip layout according to yet another embodiment.

DETAILED DESCRIPTION

With the shrinking characterized dimension and the growing integration level of integrated circuits, device features and interconnection characteristics become more complex and have more and more influence on signal transmission delay. Device features and interconnection characteristics can be evaluated based on ring oscillator (RO) test structures in some implementations of the present disclosure. Comparing with traditional addressable test chips, addressable test chips can achieve high efficiency in testing, moreover, a large number of test structures can be placed into a limited wafer area and share a pair of PADs. But the size of test structures is limited to placed into addressable test chip, addressable test chips are much complex in test process and peripheral circuits design. Some implementations of this present disclosure overcome the above design difficulty, and provide a flexible addressable test chip design method to design a type of addressable ring oscillator test chip with high accuracy and high area utilization rate.

Figure 1:
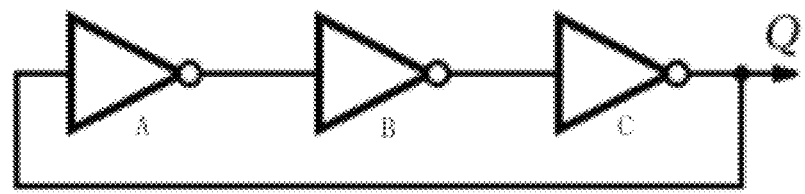
FIG. 1 is a schematic diagram of a simplest ring oscillator.

An RO can be composed of a chain odd number of gate circuit or module with logic 'NOT' function with the output of the last inverter fed back into the first. FIG. 1 is the simplest RO comprised by three NOT gates. At one point, input an initial level signal (high level or low level) on any port, the RO starts to vibrate. The oscillating period (T) is the total signal transmission delay time of the whole circuit. Therefore, the total signal transmission delay time of the whole circuit can be obtained by testing oscillation frequency (f=1/T) of RO. The output frequency of the RO showing in FIG. 1 is 1/(6×delay time of one inverter)

RO test structures are designed based on certain test purposes, the test structures used in some implementations of this present disclosure are ROs. The RO test structures can be composed of odd number of the same gate circuit or module with logic 'NOT' function, or even number of the same gate circuit or module with logic 'NOT' function and one different gate circuit or module with logic 'NOT' function. The signal transmission delay time (t=1/Nf) of a single circuit can be obtained by testing oscillation frequency of its RO (f=1/T), as such, resistance and capacitance characteristics of single circuit can be evaluated too. The function of special designed RO test structures which composed of single circuit can be extended to evaluate devices and connection characteristics. So that, the test structures based on RO play an important role to CMOS integrated circuit design and manufacture.

The most common method to test RO test structures is connecting multiple test structures to a set of PADs directly, and testing the test chip which is comprised of test structures. This type of test chips is traditional test chips, also named short-range test chips. However, each RO test structure in short-range test chip needs multiple independence PADs (always 4-6 PADs), by that analogy, hundreds RO test structures need hundreds or even thousands of PADs. One PAD needs a large area (such as 40 μm×40 μm) to be placed, this situation leads to low area utilization ratio of the whole test chip, and makes the production cost is very high. In the other aspect, in the process of testing a short-range test chip, one needs to place probes on the PADs of the test structure needed to be test, the test signal go into PADs trough probes, and then go into the test structure which connect with the PADs. After completion of testing the test structure, the probes need to be placed on the PADs of the next test structure needed to be test, repeating the test process. It can be see that, this test method has low test efficiency.

Figure 2:
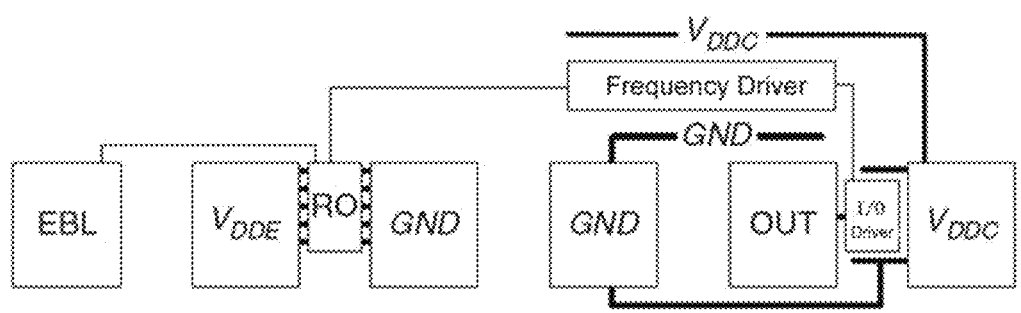
FIG. 2 is a schematic diagram of a conventional short-range ring oscillator test chip circuit.

In order to evaluate the characteristics of RO and each single circuit's characteristics of RO test chip, designing and testing short-range test chips is the most common method in the industry at present. An ordinary short-range RO test chip is shown in FIG. 2, the circuit provides supply voltage and enable signal for a RO, the waveform of the RO is output through frequency divider. One can obtain test result by analyzing the output signal. In face of the high integrated level integrate circuits and the urgent need of manufacturer to increase test speed, short-range test chips limit the development of test chips due to the low area utilization ratio and test speed. This present disclosure provides a type of novel addressable RO test chips.

In the actual test chips design process, a great deal of ROs needs to be tested, and the type of ROs also different. Normally, it can be hard to have so many ready-made ROs.

In general, one only has basic units (such as inverters) as the basic components, so it is unrealistic to draw thousands of ROs manually. Therefore, the present disclosure also provides a flexible method to generate various RO test structures simply and quickly. The method is beneficial to widely use of RO test chips.

In order to describe the present disclosure more clearly, the following text will combine with illustrated and give the detailed description by two aspects: ring oscillator test structures generation and addressable ring oscillator test chip. However, the present disclosure is not limited to these embodiments.

1. Generating RO Test Structures Using the Inverter and NAND Gate as th Basic Unit Respectively There are two kinds of basic units: 1) standard unit: gate circuits or modules with logic 'NOT' function which comprised by one or a more logic gates: inverter (NOT gate), AND gate, OR gate, NAND gate, NOR gate, XNOR gate, XOR gate, AND-OR-NOT gate; 2) nonstandard unit: gate circuit or module with logic 'NOT' function which defined by user. It can be seen that there are many kind of basic units to constitute ring oscillator. Various ring oscillators comprised by basic units have two situations: 1) the ring oscillators comprised by different basic units, 2) the ring oscillators comprised by a kind of basic units but with a different number of basic units.

Various basic units and various stages make the type of ROs are very diverse, it meaning that various RO test structures. If one needs various RO test structures, drawing thousands of ROs manually can be laborious. In the process of generating RO test structures of some embodiments in this present disclosure. Fist, using a cell template to replace a basic unit to generate RO test structure, and using parameters to control the stages of RO; then, one can choose different basic units to instant the RO test structure, and obtain various RO test structures. The generated RO test structures can be placed into test chips directly, and they also can be used in other circuits design.

Figure 3:
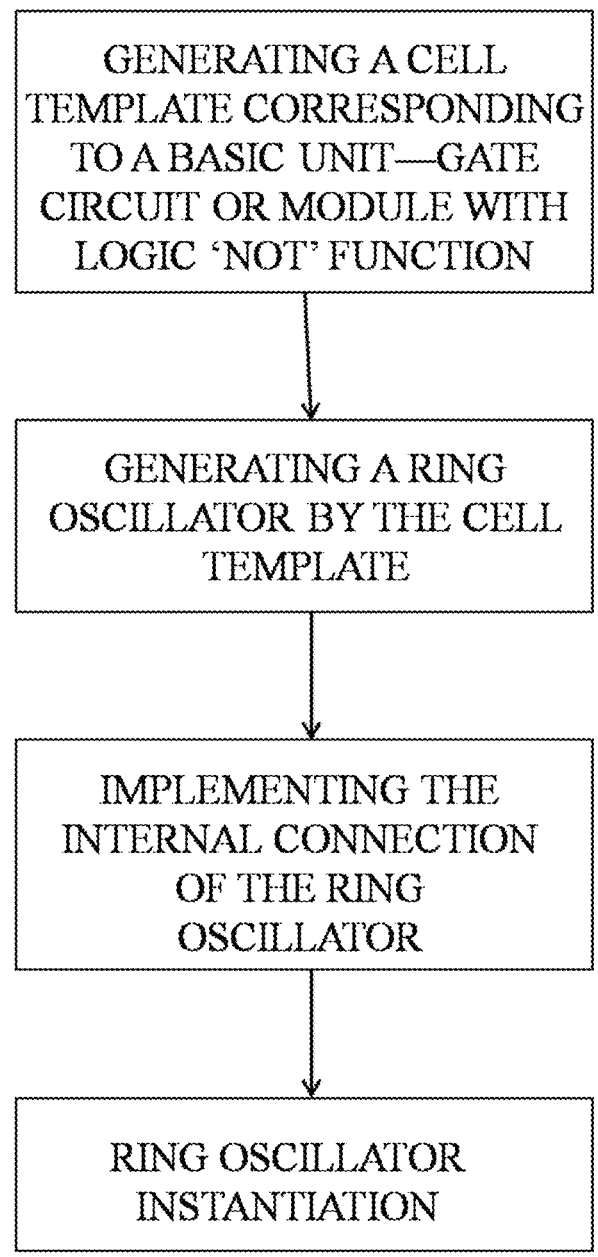
FIG. 3 is a schematic diagram of the steps to generate various ring oscillators according to some implementations.

Some embodiments of this disclosure provide a method to generate various ring oscillators is shown in FIG. 3: fist, generating a cell template corresponding to a basic unit; second, generating ring oscillator using the cell template as the basic unit; third, implementing the internal connection of the ring oscillator; finally, ring oscillator instantiation. Various ring oscillators can be generated simply and quickly by this method, so that, user don't needs to draw ROs manually.

Figure 4:
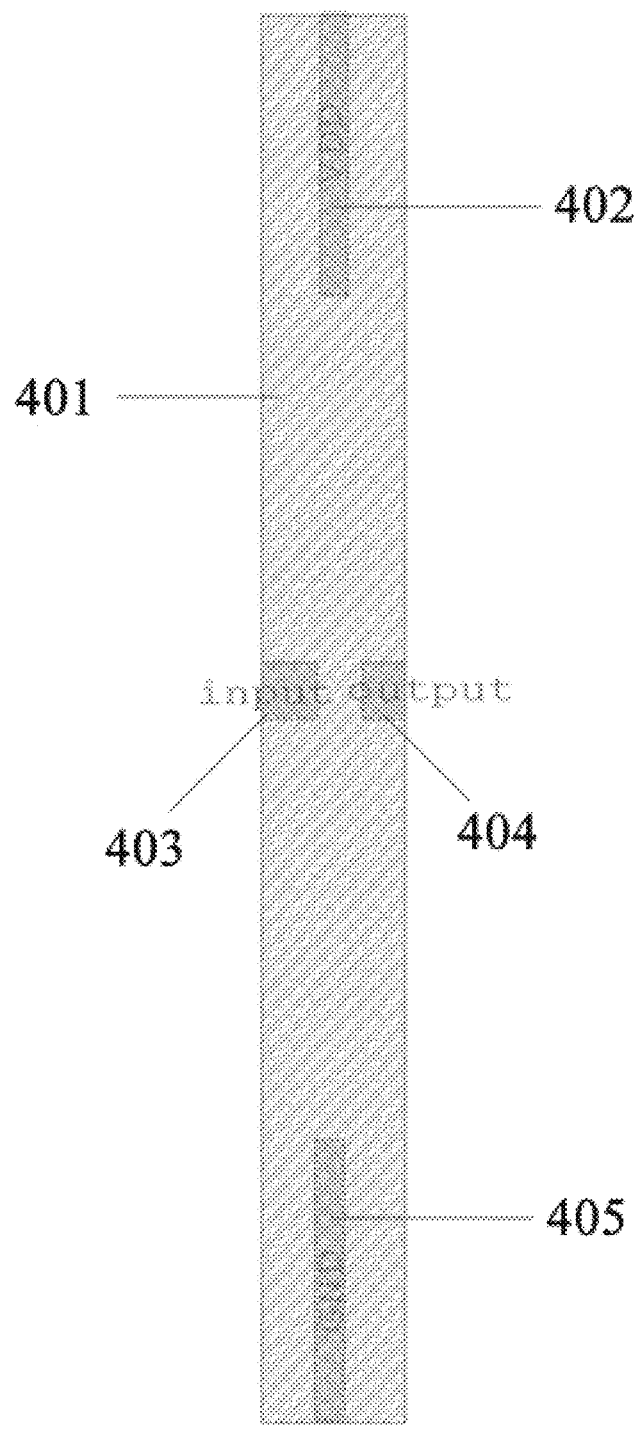
FIG. 4 is a schematic diagram of a generated cell template according to some implementations.
Figure 5:
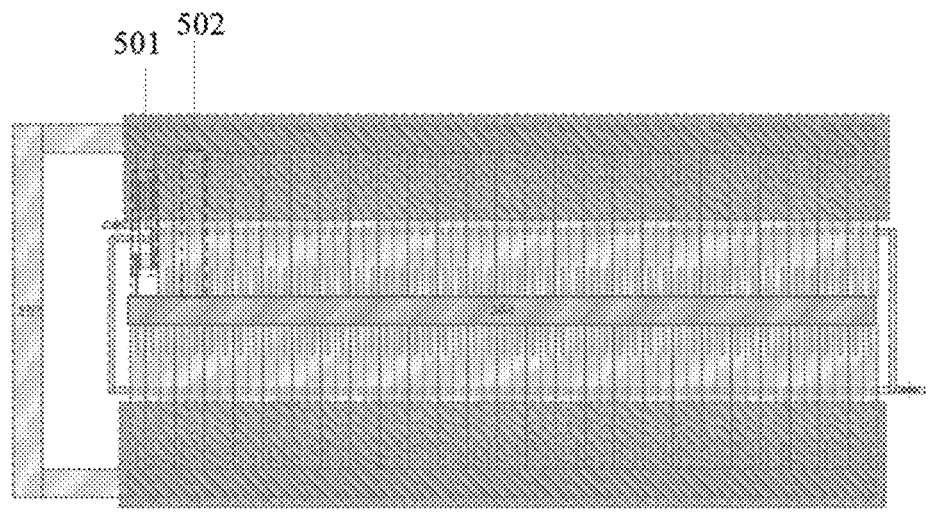
FIG. 5 is a schematic diagram of a ring oscillator with the cell template as its basic structure which generated according to some implementations.
Figure 6:
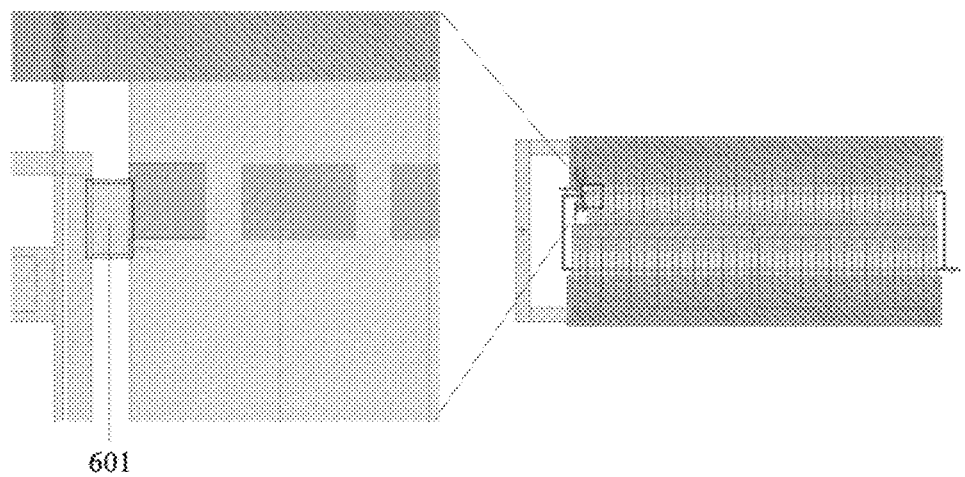
FIG. 6 is a schematic diagram of the path connection between basic structures of ring oscillator according to some implementations.
Figure 7:
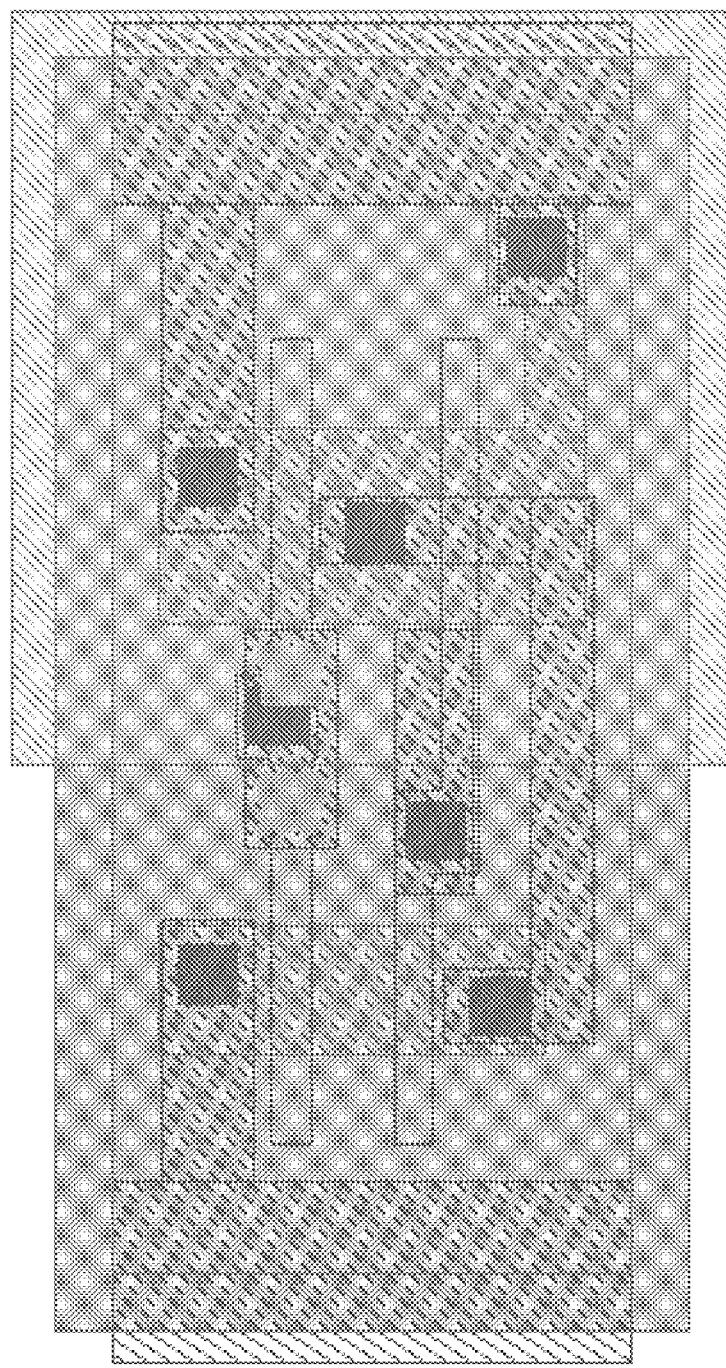
FIG. 7 is a schematic diagram of a type of basic unit—inverter (NOT gate) which is used in some implementations of this disclosure.
Figure 8:
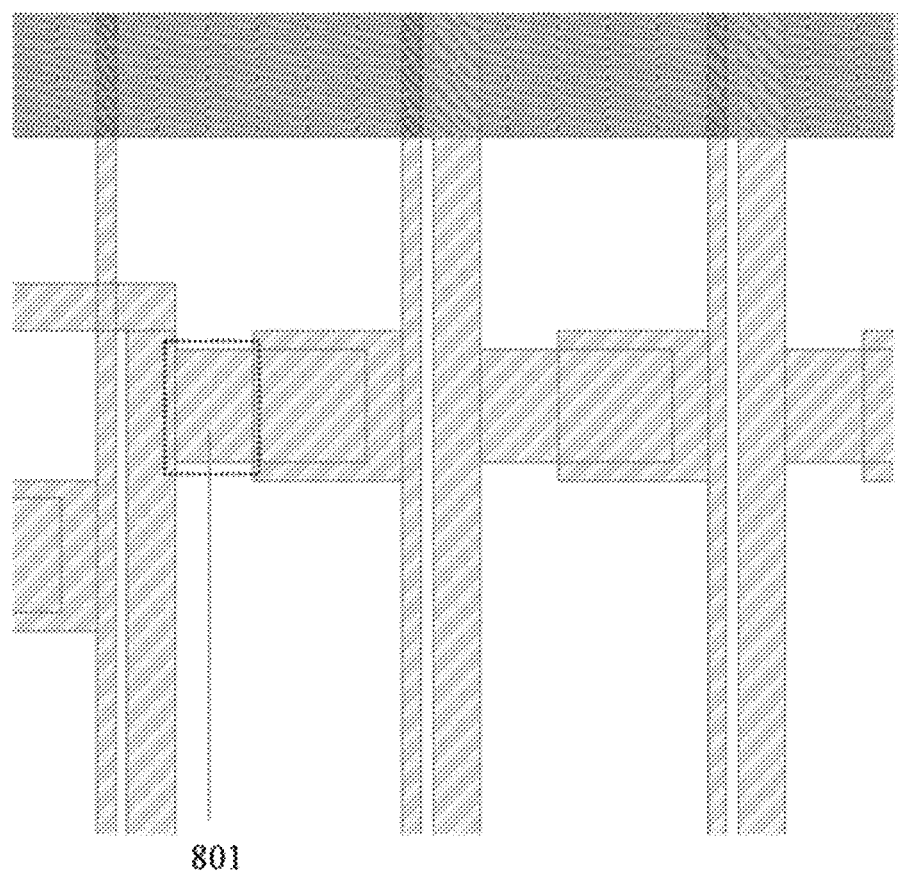
FIG. 8 is a schematic diagram of the generated connection between two pins through path connection and constraint in the process of instantiation according to some implementations.
Figure 9:
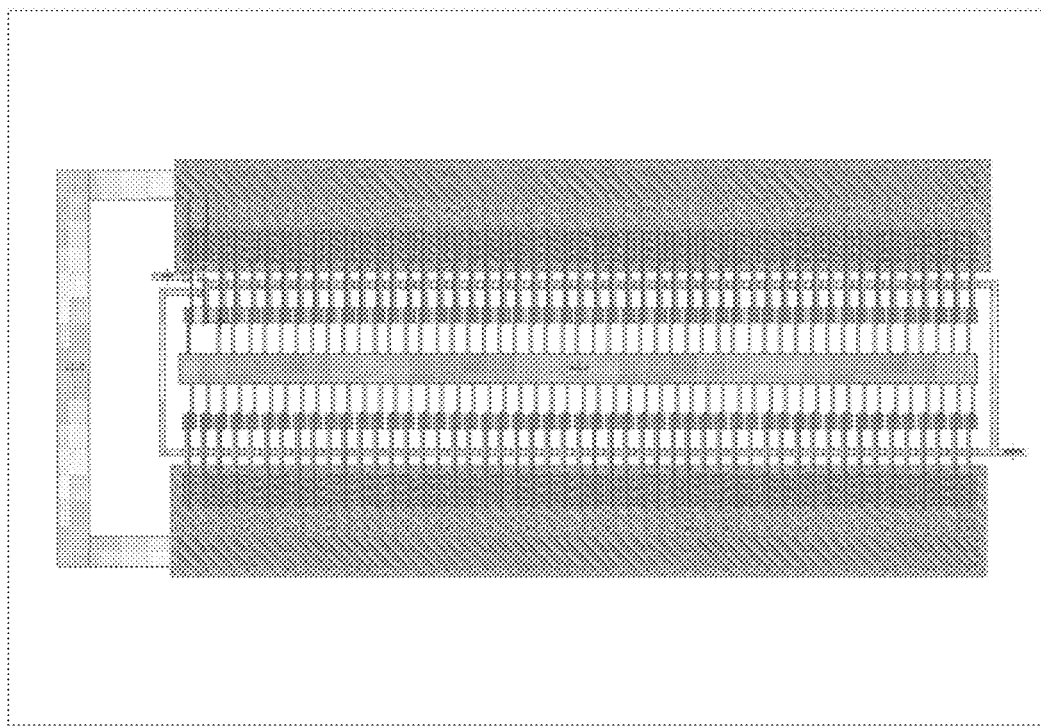
FIG. 9 is a schematic diagram of a ring oscillator after instantiation according to some implementations.

This embodiment uses one of the basic units, for example, an inverter/NOT gate, to generate ROs. The Specific operation steps can include: (a) Generating a cell template corresponding to an inverter: as shown in FIG. 4, defining a rectangular Cell Template type of parameterized cell (PCell) 401, this PCell corresponding to an inverter, and using the location template (Rect template) to define the needed pins when the inverter is tested, along with the corresponding search label of each pin. 402, 403, 404, 405 in FIG. 4 are all the defined pins; 402 and 405 are the pins to connect VDD and GND respectively; 403 and 404 are the pins to connect INPUT and OUTPUT respectively, it can be said that electronic signal input through 403 pin and output through 404 pin. At this point, the Cell Template can be used as an inverter. (b) Generating a RO by the cell template: as shown in FIG. 5, using the cell template shown in FIG. 4 to replace the basic unit, and using parameters to control the number of cell templates, generating a basic ring oscillator. The parameter in this embodiment is 50, moreover, there are 1 oscillation structure is NAND gate, it meaning that the generated RO has 51 stages. In FIG. 5, 502 is the cell template of FIG. 4, 501 is the oscillation structure—NAND gate placed by user. (c) Implementing the internal connection of the ring oscillator: as shown in FIG. 6, implementing the connection between cell templates or cell template and NAND gate by path, and aligning the path by using constrains. In FIG. 6, 601 is the path, it can be named the wire routing between pins. (d) Ring oscillator instantiation: as shown in FIG. 7 is an inverter, using inverters to replace cell templates, and searching the corresponding pins based on the labels defined in a), in accordance to the location of the pins, using the definition of path from c) and the constraints to ensure the connections between pins. An example of the connection result is shown in FIG. 8, 801 is the adjusted wire routing. Comparing with FIG. 6, in FIG. 8, it can be seen that the path has been aligned by constraints. After the above steps, the instantiated RO is shown in FIG. 9.

In the step (a), therein the pins can be represented by any kind of polygons, rectangle is the shape commonly used, it also can be represented by triangle, pentagon, hexagon, etc. The parameterized cell templates are polygons with parametric characteristics, rectangle is the shape commonly used according to drawing habits and convenience.

In the step (b), the cell template is parameterized, so as to the stages of RO can be controlled flexible by parameters. In some embodiments, the oscillation structure is one part of ring oscillators. The oscillation structure is a gate circuit or module with logic 'NOT' function too, its type can be the same to basic unit for instantiation, or different to basic unit for instantiation. In this embodiment, the basic unit is inverter, and the oscillation structure is not inverter but NAND gate. In the other words, ring oscillator can be comprised by 'N+1' basic units, 'N' is even and it represents the number of a kind of basic unit, '1' is a basic unit for oscillation.

In the step (c), therein the path is a kind of basic layout structure for routing between pins.

In the step (d), before the step of ring oscillator instantiation, using cell templates to replace one of the basic units—inverters in this embodiment. In some embodiments, the cell templates can replace other basic units, which kind of basic unit the cell template represented can be confirmed in the step of ring oscillator instantiation by user. Therefore, it realizes the function that using parameterized cell templates to replace basic units to generate various ROs flexibly.

Figure 10:
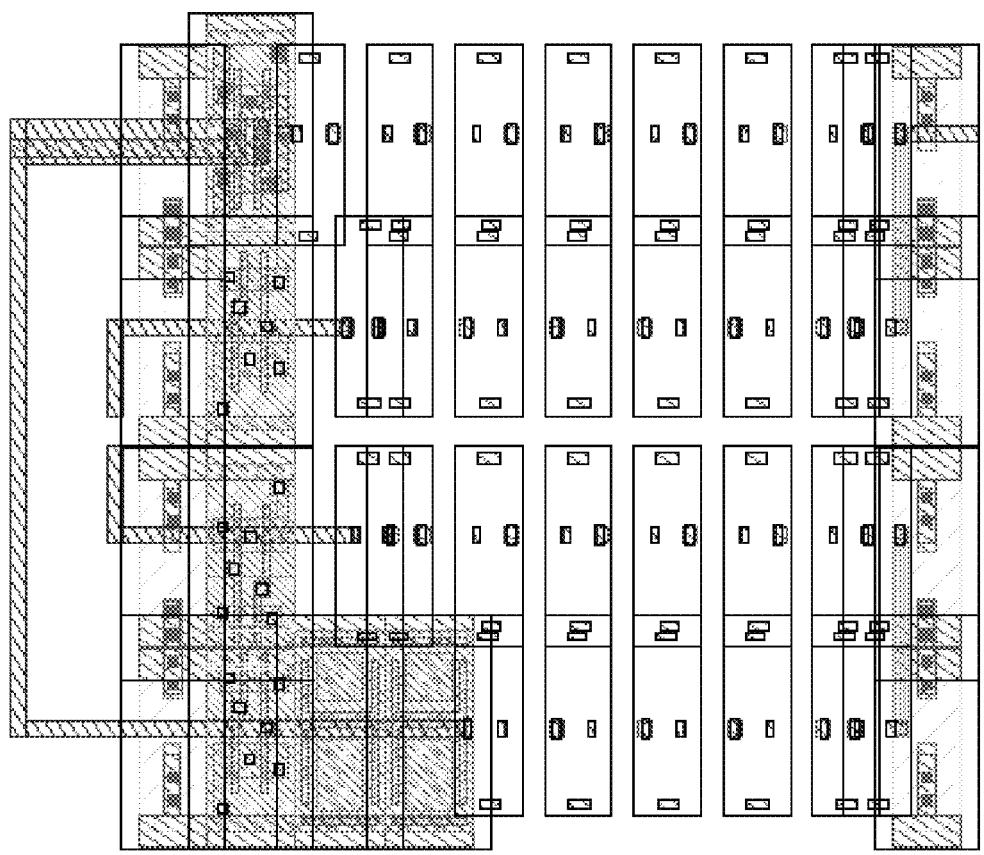
FIG. 10 is a schematic diagram of a ring oscillator with cell templates as its basic structures which generated according to some implementations.
Figure 11:
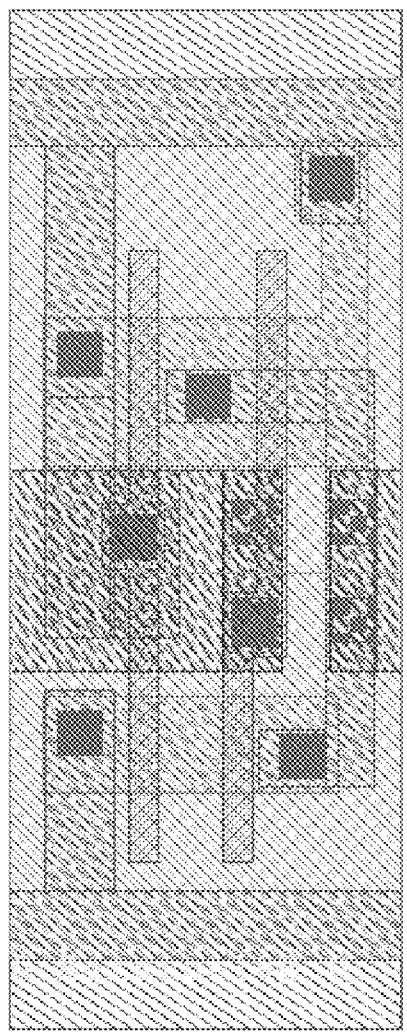
FIG. 11 is a schematic diagram of a kind of basic unit—NAND gate which is used in some implementations of this disclosure.
Figure 12:
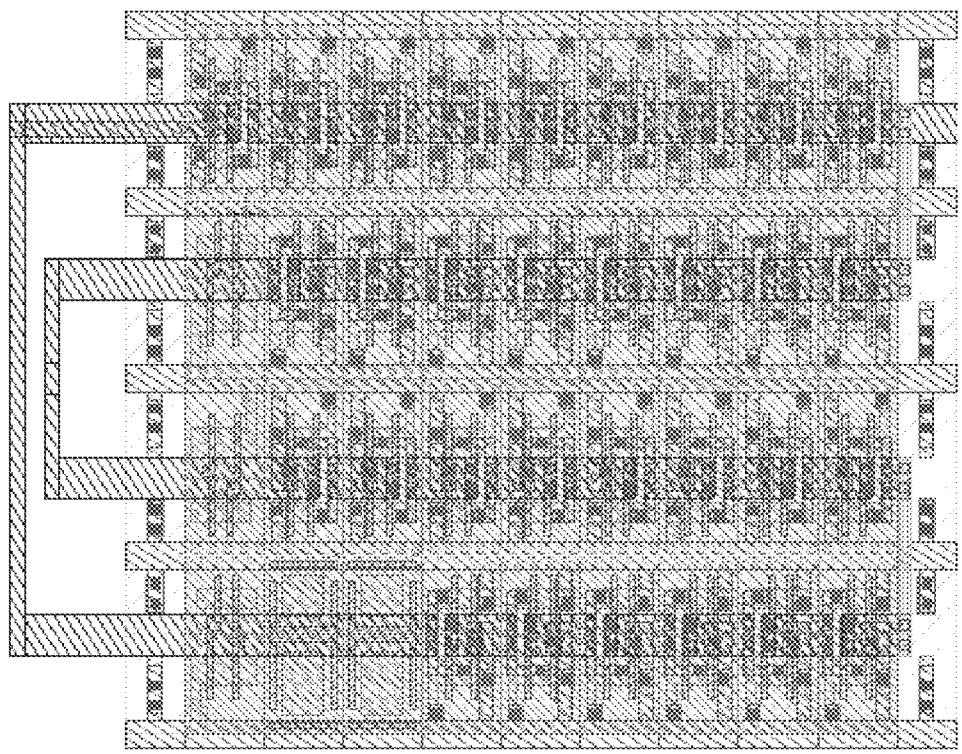
FIG. 12 is a schematic diagram of a ring oscillator with cell templates as its basic structure which generated according to some implementations.

In order to illustrate the method to generate RO of this disclosure more clearly, this embodiment use one of the basic units, NAND gate, to generate ROs. The specific operation steps can include: (a) Generating a cell template corresponding to an NAND gate: defining a rectangular Cell Template type of parameterized cell (PCell), this PCell corresponding to a NAND gate, and using the location template (Rect template) to define the needed pins when the NAND gate is tested, along with the corresponding search label of each pin. As shown in FIG. 4, the Cell Template can be used as a NAND gate. (b) Generating the RO by the cell template: as shown in FIG. 10, using the cell template shown in FIG. 4 to replace the basic unit, and using parameters to control the number of cell templates, generating a basic ring oscillator. The parameter in this embodiment is 31, moreover, it meaning that the generated RO has 31 stages, the oscillation structure is the same type to basic unit. (c) Implementing the internal connection of the ring oscillator: implementing the connection between cell templates or cell template and oscillation structure by path, and aligning the path by using constrains. The path can be named the wire routing between pins. (d) Ring oscillator instantiation: as shown in FIG. 7, 11 is a NAND gate, using NAND gates to replace cell templates, and searching the corresponding pins based on the labels defined in a), in accordance to the location of the pins, using the definition of path from c) and the constraints to ensure the connections between pins. After the above steps, the instantiated RO is shown in FIG. 12.

The RO test structures generated by this method can be used in test chips or other circuits design through software. If one needs to test other kind of ROs which different to the above two embodiments, one can use this method to generate the needed ROs by changing the basic units to replace cell templates and changing parameters of cell templates. If one needs to test multiple RO test structures, a plurality of RO test structures can be obtained by copying or multiple calls.

The method to generate ROs can save a lot of labors and time.

The above method to generate ROs simply and quickly can be realized by a computer software package, which includes computer instructions stored in non-temporary computer readable medium, which characterized in that, the software includes basic units and relevant steps to generate ring oscillators, using the stored basic units to generate ring oscillators by using at least one computer to implement these steps, these instructions include: (a) Generating a cell template corresponding to a basic unit: defining a parameterized cell template, defining the needed pins for the cell template, along with the corresponding search label of each pin. (b) Generating the ring oscillator by the cell template: using the cell template generated in a) to replace the basic unit and to generate the ring oscillator. (c) Implementing the internal connection of the ring oscillator: implementing the connection between cell templates or cell template and oscillation structure by path, and aligning the path by using constrains. (d) Ring oscillator instantiation: using basic units to replace cell templates, and searching the corresponding pins based on the labels defined in a), in accordance to the location of the pins, using the definition of path from c) and the constraints to ensure the connections between pins.

The above method to generate ROs simply and quickly can be realized by a system, which characterized in that, the system includes at least one computer, the computer using ring oscillator basic unit to design and generate various ring oscillators quickly, the system includes: (a) Generating a cell template corresponding to a basic unit: defining a parameterized cell template, defining the needed pins for the cell template, along with the corresponding search label of each pin. (b) Generating the ring oscillator by the cell template: using the cell template generated in (a) to replace the basic unit and generate the ring oscillator. (c) Implementing the internal connection of the ring oscillator: implementing the connection between cell templates or cell template and oscillation structure by path, and aligning the path by using constrains. (d) Ring oscillator instantiation: using basic units to replace cell templates, and searching the corresponding pins based on the labels defined in a), in accordance to the location of the pins, using the definition of path from c) and the constraints to ensure the connections between pins.

2. Addressable Ring Oscillator Test Chip:

(1) Circuit Structure of Addressable Ring Oscillator Test Chip

Figure 13:
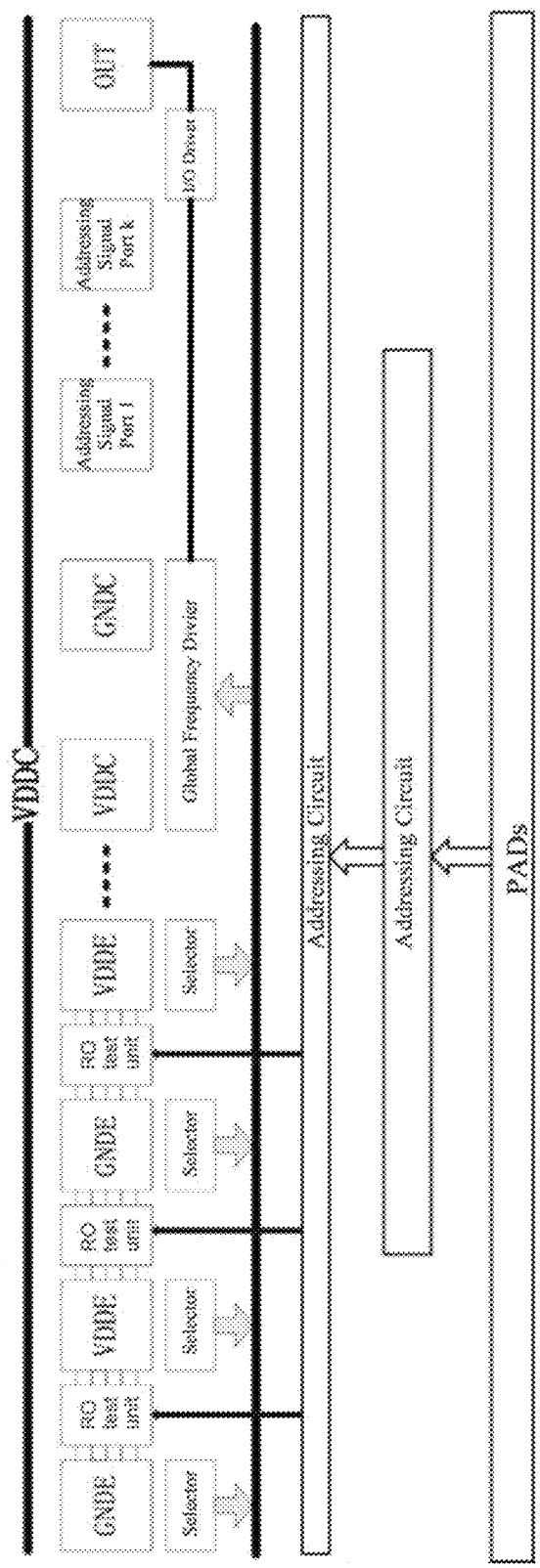
FIG. 13 is a circuit schematic diagram of a type of addressable ring oscillator test chip according to some implementations.

As shown in FIG. 13, the novel addressable test chip according to some embodiments disclosed herein includes a number of ring oscillator test units (hereafter referred to as 'test unit(s)', it is labeled as 'RO test unit' in FIG. 13 and a peripheral structure, the peripheral structure includes peripheral circuits and PADs. The PADs of peripheral structure are connection points of routing in the test chip: shared power source, plurality of independent power sources, input/output signals and address signals are provided by PADs. The peripheral circuits include: addressing circuit, signal transmission channel, global frequency divider and I/O Driver. All peripheral circuits share a pair of power source VDDC and GNDC; each test unit is associated with a pair of independent power source VDDE and GNDE. Adopting independent power source for each test unit: on the one hand, making the distance as close as possible between the test unit and its power source to decrease voltage drop of wiring, so that the voltage applied on ring oscillator become more close to power source voltage; on the other hand, the independent power source is able to avoid influence among test units, the independent power source of the selected test unit is working and the independent power sources of the unselected test units are grounded.

As shown in FIG. 13, it can be seen that, each test unit is placed between a pair of VDDC and GNDE PADs, and each test unit shares the VDDC and GNDE with its two adjacent neighboring test units. The number of test units is proportional to the number of PADs which designed by user. We can define this placing rule as 'nearest placing rule'. The placing rule reduces the number of PADs and saves area for test chips on the one hand, on the other hand, placing test unit and its power source as close as possible has capable of reducing wire resistance and improving test accuracy. When the test unit is too big to be placed between the corresponding pair of independent power source VDDE and GNDE, one also can inobservance the 'nearest placing rule', as saving area is the main purpose of design test chips, this situation is rare.

Figure 15:
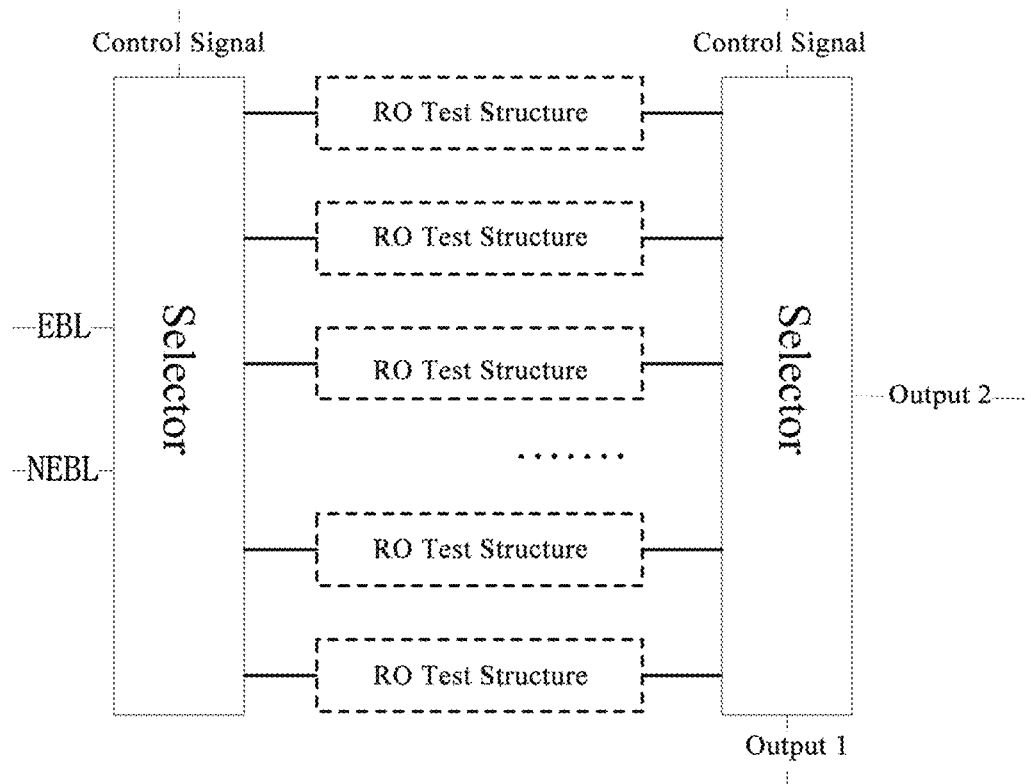
FIG. 15 is a schematic diagram of a signal transmission channel according to some implementations.
Figure 16:
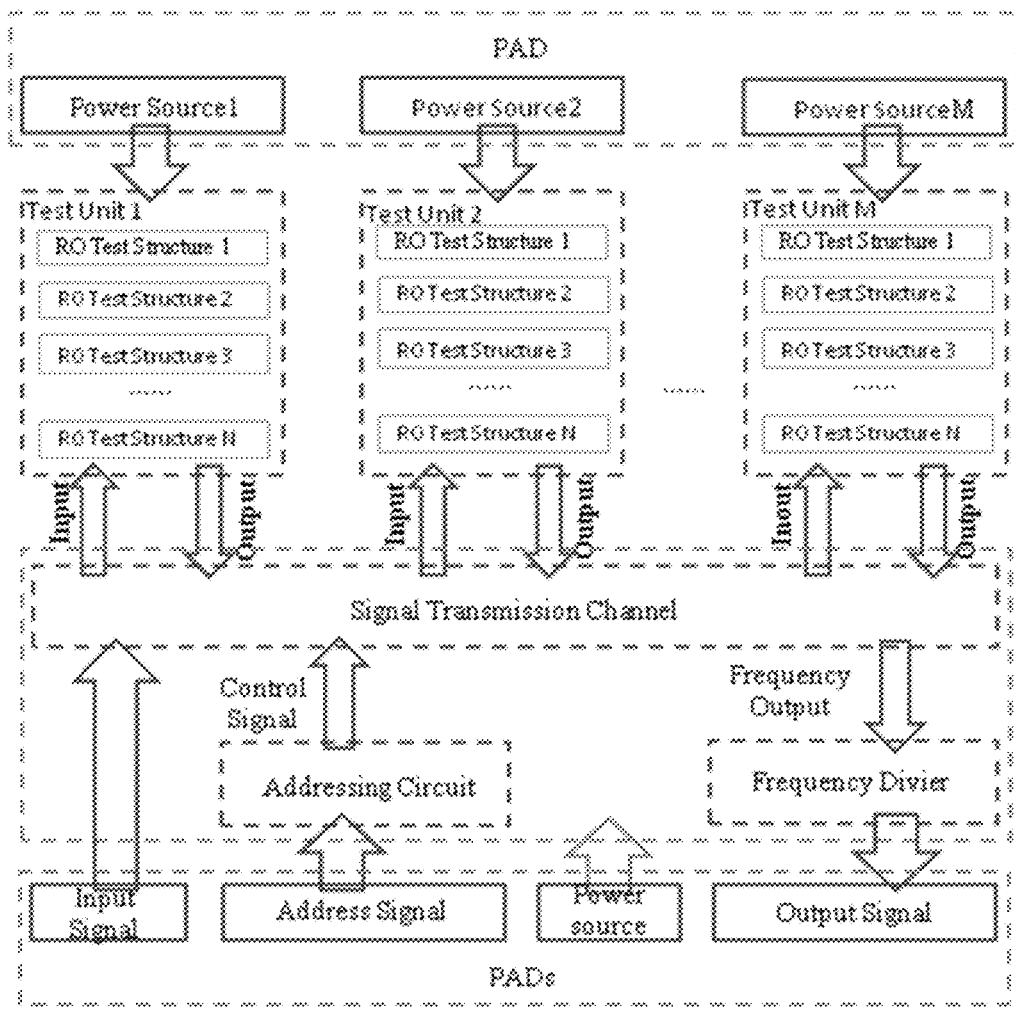
FIG. 16 is a schematic diagram of the addressable ring oscillator test chip circuit structure according to some implementations.

Each test unit includes one or more ring oscillator test structures (hereafter referred to as 'test structure(s)', it is labeled as 'RO test unit' in FIG. 15 and FIG. 16), the ring oscillator test structures can be generated by the method to generate various ring oscillators simply and quickly. The one or more ring oscillator test structures share a pair of independence power source. All of the test structures share a pair of input and output signal PADs of the peripheral structure. Each ring oscillator test structure includes a ring oscillator, each ring oscillator can be configured zero to a few partial frequency dividers due to the transmission frequency range of peripheral circuits or the final output frequency range. On the one hand, if the oscillation frequency of one ring oscillator exceeds the transmission frequency range of peripheral circuits, the ring oscillator need to be configured one or a few partial frequency divider(s) to decease its frequency. On the other hand, one or a few global frequency dividers are selected by synthesizing the final output frequency range and are placed in peripheral circuits due to the difference of the type and the output frequency of all of the test structures, but if the oscillation frequency of one ring oscillator still exceeds the final output frequency range, the ring oscillator need to be configured one or a few partial frequency divider(s). It shows that the number of partial frequency dividers and global frequency dividers can be configured according to actual situation. Therefore, the method can configure frequency dividers neatly and save area of frequency dividers.

Figure 14:
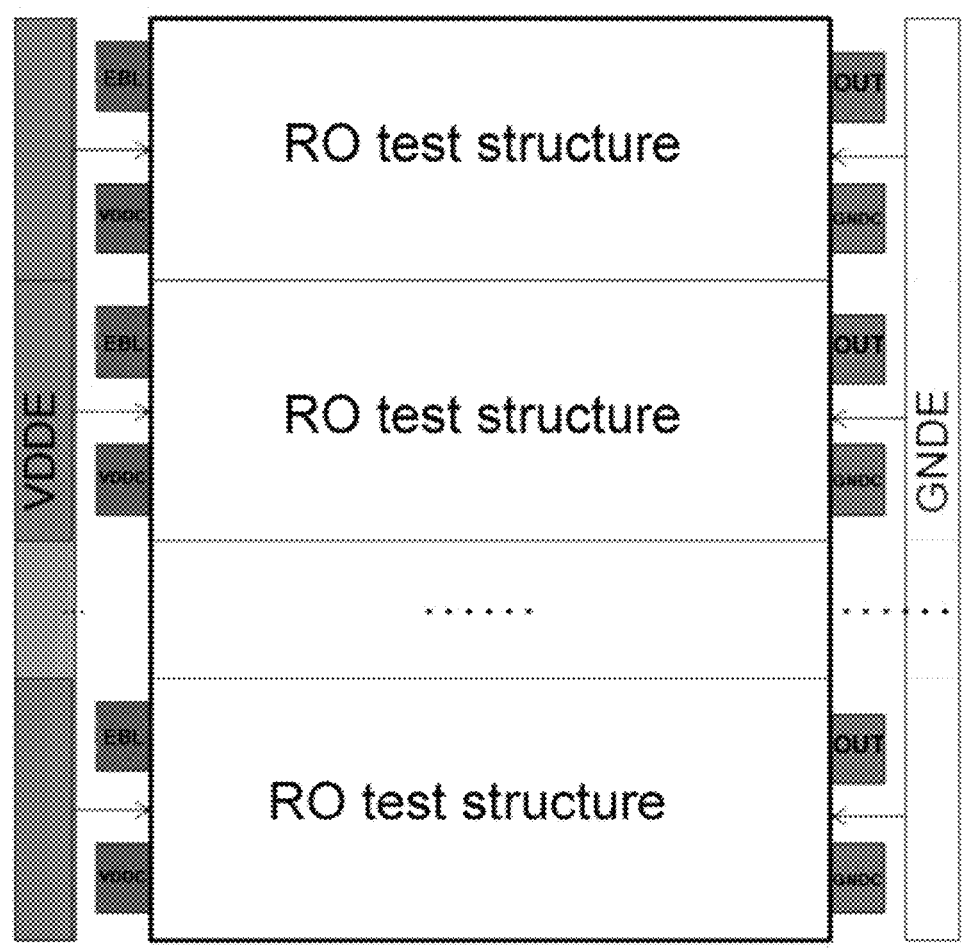
FIG. 14 is a schematic diagram of a test unit according to some implementations.

FIG. 14 shows a test unit with partial frequency dividers, each ring oscillator test structure include 6 ports: a pair of power source ports VDDE and GNDE to power ring oscillator, a pair of power source ports VDDC and GNDC to power partial frequency divider(s), oscillation signal port EBL, oscillation output signal port OUT. In some implementations, each test structure includes 4 ports.

FIG. 15 shows the signal transmission channel of peripheral circuits, it includes signal input channel and signal output channel. In a test unit, when a ring oscillator test structure is selected by addressing circuit and powered by the independent power source of the test unit, the signal input channel inputs oscillation signal EBL by selector to the selected test structure, the unselected test structures are input static signals NEBL. NEBL signals can avoid oscillation of the unselected ring oscillator test structure caused by spurious triggering and improve the stability of test circuit effectively. The signal output channel includes output channels inside test units and output channel between test units, the output channels inside test units make the outputs of unselected test structures are shielded by selectors, the oscillation frequency of selected test structure is output; for a test unit, output channels between test units take the output of the last level test unit as output 1, the output of the test unit as output 2, output 1 add up output 2 as the input of the next level test unit.

As shown in FIG. 16, taking the circuit structure of an addressable RO test chip with M×N test structures as an example to explain the circuit working principle: when the peripheral circuits are powered, addressing signal ports provide a set of address signals, and a set of control signals are generated by addressing circuit; the set of control signals allow the selected (powered) test structure's signal transmission channel on, so that, the input/output signal can be input/output; the input signal leads the selected ring oscillator test structure starts to oscillate, the unselected ring oscillator test structures always maintain in static state, so as to avoid oscillation of the unselected ring oscillator test structures caused by spurious triggering; oscillation frequency of the selected ring oscillator test structure is output by signal transmission channel; at last, the oscillation frequency is decreased by global frequency driver to the acceptable frequency range and output to an external tester through the output PAD.

(2) The Layout of Addressable Ring Oscillator Test Chip:

Taking an addressable ring oscillator test chip as an example, in the RO test chip, each test unit includes 8 RO test structures, and each test structure is configured with a partial frequency driver.

Figures 1, 17:
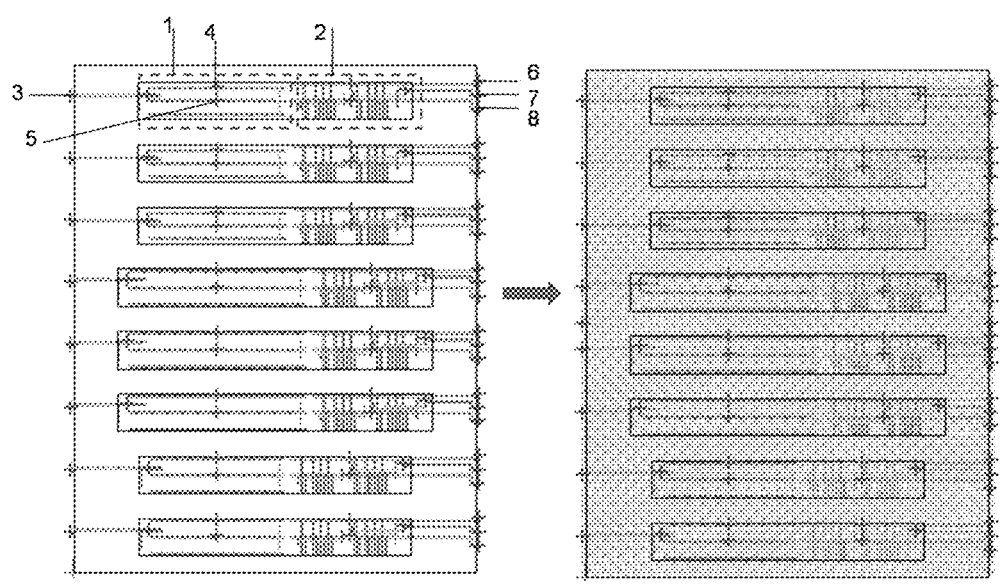
Figures 2, 17:
Figures 3, 17:
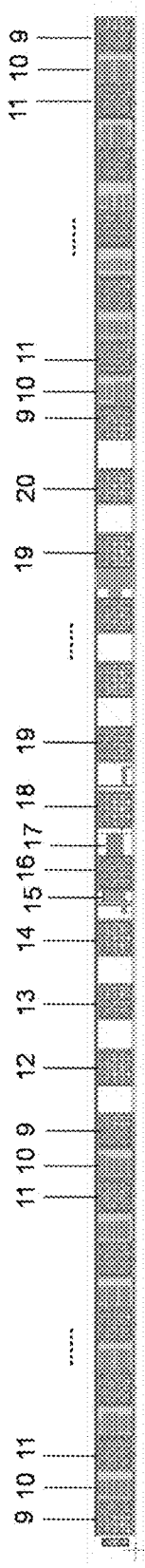

The layouts of the addressable ring oscillator test chip are showed in FIG. 17-1, FIG. 17-2 and FIG. 17-3. FIG. 17-3 is the globe view of the test chip layout, FIG. 17-1 and FIG. 17-2 are the parts of the test chip layout: the test units and the peripheral structure respectively.

As shown in FIG. 17-2, left-hand image is the test chip without routing, right-hand image is the routed test chip. In FIG. 17-2, 1 is an RO, 2 is a partial frequency divider. Each test unit includes 8 test structures, each test structure has 6 ports: 3 is EBL port, 4 and 5 are independent power source ports VDDE and GNDE, 6 and 8 are power source ports VDDCE and GNDC, 7 is OUT port.

As shown in FIG. 17-3, an integrated test chip can be generated by taking test units into the peripheral structure and routing. In the FIGS. 17-3, 9 and 11 are independent power source VDDE and GNDE respectively, 10 is a test unit, 12 and 13 are shared power source VDDC and GNDC respectively, 14 and 16 are input ports of EBL and NEBL signals respectively, 20 is a total addressing signal port.

Generally, the VDDE, GNDE, OUT ports can be shared by many ring oscillator test structures. The other three ports can't be shared. In the case of eight ROs, they need 3 PADs as VDDE, GNDE, OUT ports respectively, 24 PADs as VDDC, GNDC, EBL ports. The area occupied by the 27 PADs is not allows to place test units, so that, these PADs need occupy a large of area. Some implementations of this disclosure provide a type of novel addressable RO test chip, the design of the peripheral structure and the placing method of test units are optimized. VDDC, GNDC, EBL and OUT ports can be shared. All test structures in a test unit share a pair of independent power source: VDDE and GNDE, and the test unit shares the VDDE and GNDE with its two adjacent neighboring test units. In case of a test chip with M test units, and each test unit includes eight ROs. Then a test unit needs four PADs as VDDC, GNDC, EBL and OUT ports respectively, two PADs as VDDE and GNDE ports, the method decreases the number of PADs and increases area utilization ratio significantly. It means that the test chip includes M×8 test structures, each unit shares the VDDE and GNDE with its two adjacent neighboring test units, it can decreases the number of PADs and increases area utilization ratio further. Over here, the number of test units can be decided by requirements of customer or the number of PADs in the test chip, and the number of test units is in proportion to the number of PADs in the test chip.

The number of test structures in a test unit is related to requirements of customer and the addressing ability of addressing circuit, the number of test structures in a test unit is in proportion to the addressing ability of addressing circuit. In this implementation, on account of each test unit includes eight test structures, two independent power source ports VDDE and GNDE can control two test units or 16 test structures on average, thus, it needs 16 address signals for addressing and testing. Each addressing signal port has two type signal situations: 1 and 0, four addressing signal ports (according to 4 PADs) can generate $2^4$ address signals. Accordingly, it needs to increase the ability of addressing circuit when the number of test structures increasing, adding more addressing signal ports to generate more address signals, and the number of address signals is same to or greater than the number of test structures of two test units. Combining with FIG. 17-3, it has four addressing signal ports 19, 20 is a total addressing signal port to control the four addressing signals, ports 19 and port 20 all have two type signal situations: 1 and 0, therefore, $2^4$ address signals can be generated by the four addressing signal ports 19, and the $2^4$ address signals can select $2^4$ test structures to test. When the situation of total addressing signal port is 0, any test structure can't be selected; When the situation of total addressing signal port is 1, one address signal of $2^4$ address signals can be selected to select one test structure As shown in FIG. 17-3, it also can be seen that, each test unit is placed between a pair of independent power source. The placing rule s the number of PADs and saves area for test chip on the one hand, on the other hand, placing test unit and its power source as close as possible has capable of reducing wire resistance, decreasing the influence of wire resistance to voltage drop and improving test accuracy.

Figure 18:
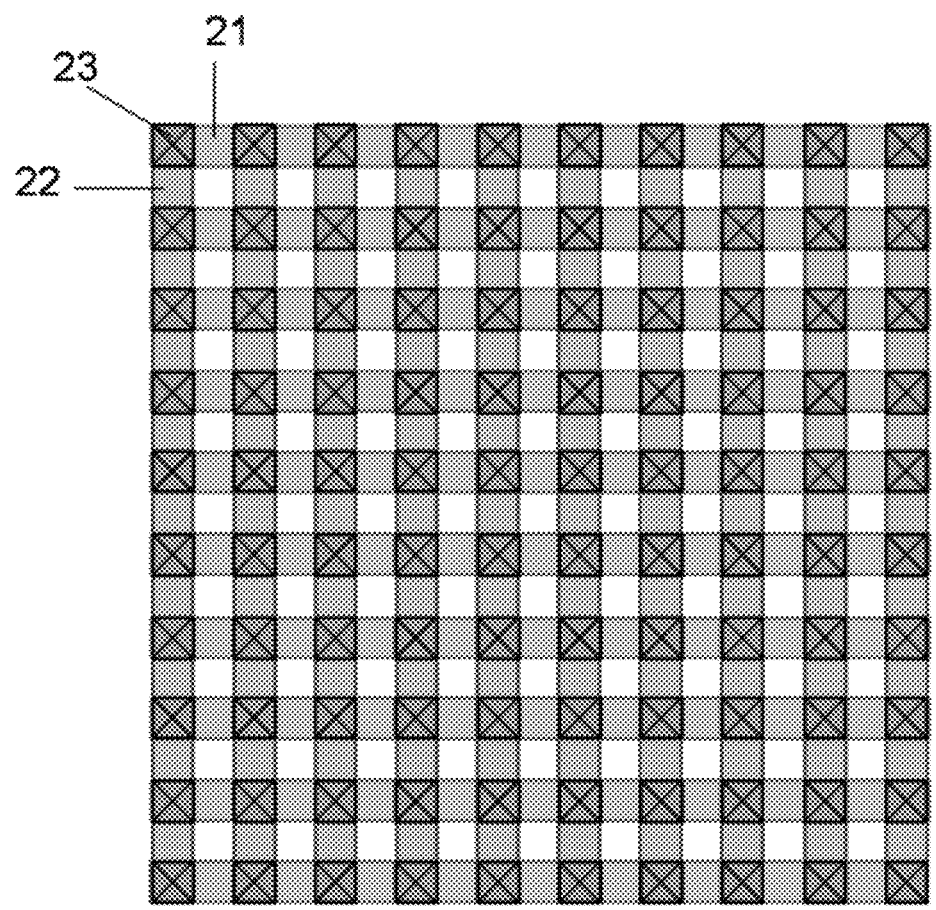
FIG. 18 is a schematic diagram of metal layers parallel networking routing according to some implementations.

In order to reduce the wire resistance between test unit and its independent power source, in this implementations, the connection between each test unit and its independent power source adopting metal layers parallel networking routing. Compared with one metal layer routing, metal layers parallel networking routing has capable of minimizing wire resistance and improving the test accuracy. As shown in FIG. 18, it is the two metal layers parallel networking routing, 21 is metal layer M1, 22 is metal layer M2, 23 is via. In some implementations, the connection can be more than two metal layers parallel networking routing.

According to the above description, the working principle of test chip in actual layout can be described as following: the test unit 10 is placed and powered between a pair of independent power source 9 (GNDE) and 11 (VDDE), the peripheral circuits and the partial frequency dividers are powered by 12 (VDDC) and 13 (GNDC). When one address signal is selected corresponding to one test structure, in the test unit of the selected test structure, the switching circuit on, port 14 and port 16 provide EBL signal and NEBL signal synchronously and respectively, the selected test structure is provided EBL signal and the unselected test structures are provided EBL signals by selectors. Oscillation frequency of the selected test structure is decreased by partial frequency driver output and output to the peripheral circuit; at last, the oscillation frequency is output through global frequency driver and I/O driver to an external tester to test.

The present disclosure also provides a test method using the novel addressable ring oscillator test chip. The test method includes: when the peripheral circuits are powered, the address signal provide a set of address, a set of control signal is generated by addressing circuit; a test unit is supplied power by power signals, the set of control signal allow the selected ring oscillator test structure's signal transmission channel on, input/output signal can be input/output; input signal leads the selected ring oscillator test structure starts to oscillate, the unselected ring oscillator test structures always maintain in static state, so as to avoid oscillation of the unselected ring oscillator test structures caused by spurious triggering; oscillation frequency of the selected ring oscillator test structure is output by signal transmission channel; at last, the oscillation frequency is decreased by global frequency driver to the acceptable frequency range and output to a tester.

The present disclosure also provides a test system, which includes: one or more aforesaid addressable ring oscillator test chips. For example, the test system includes at least one addressable ring oscillator test chip and a tester; after oscillation frequency of the selected ring oscillator is output by test method using the said addressable ring oscillator test chip, the oscillation frequency is output by output PAD to an external tester and tested by this tester.

Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. An addressable ring oscillator test chip, comprising:
a plurality of ring oscillator test units;
a peripheral structure including peripheral circuits and Pads;
wherein the peripheral circuits share a first power source and a first grounding;
wherein each test unit is associated with an independent power source to thereby decrease voltage drop resulting from wiring and to reduce influence from other test units; and
wherein the peripheral circuits comprise: an addressing circuit; a signal transmission channel; a global frequency divider; and a driver.

2. The addressable ring oscillator test chip of claim 1, wherein a connection between each test unit and its independent power source comprises multiple metal layers parallel networking routing, to thereby minimize wire resistance and improve test accuracy.

3. An addressable ring oscillator test chip, comprising:
a plurality of ring oscillator test units;
a peripheral structure including peripheral circuits and Pads;
wherein the peripheral circuits share a first power source and a first grounding;
wherein each test unit is associated with an independent power source to thereby decrease voltage drop resulting from wiring and to reduce influence from other test units; and
wherein each ring oscillator test unit is disposed between Pads of its associated independent power source, and wherein the test unit shares a second power source and a second grounding with its two adjacent test units.

4. The addressable ring oscillator test chip of claim 1, wherein each test unit includes one or more ring oscillator test structures, and wherein number of ring oscillator test structures in a test unit is proportional to an addressing ability of the addressing circuit.

5. The addressable ring oscillator test chip of claim 4, wherein each ring oscillator test structure includes a ring oscillator, wherein each ring oscillator is configurable with zero or more partial frequency dividers, and wherein if an oscillation frequency of a ring oscillator exceeds a transmission frequency range or an output frequency range of the peripheral circuits, then the ring oscillator is configured with one or more partial frequency dividers.

6. The addressable ring oscillator test chip of claim 5, wherein each ring oscillator test structure comprises six ports: a pair of power source ports, a pair of power source ports, a oscillation signal port, and an oscillation output signal port; wherein if a ring oscillator does not need to be configured with partial frequency dividers or the partial frequency dividers sharing a power source with ring oscillator, each ring oscillator test structure comprises four ports: a pair of power source ports, a oscillation signal port, and an oscillation output signal port.

7. The addressable ring oscillator test chip of claim 5, wherein only a selected ring oscillator test structure has its associated test unit being supplied electricity by an associated independent power source, while other independent power sources are grounded, to thereby reduce influence from the peripheral circuits on powering the addressable ring oscillator test chip, and improve stability of the test chip.

8. The addressable ring oscillator test chip of claim 1, wherein the signal transmission channel of the peripheral circuits comprises a signal input channel and a signal output channel; wherein the signal input channel is configured to input an oscillation signal via a selector for the selected test structure, wherein unselected test structures are input with a static signal, to avoid oscillation of the unselected test structures caused by spurious triggering, thereby improving stability of the test chip.

9. The addressable ring oscillator test chip of claim 8, wherein the signal output channel is configured to output, through the selector, an oscillation waveform of a test structure selected by the addressing circuit, and wherein outputs of unselected test structures are shielded.

10. A method of generating a variety of ring oscillators, the method comprising:
a) generating a cell template corresponding to a basic unit, including defining a parameterized cell template;

b) generating a ring oscillator based on the cell template, including generating ring oscillators of different stages by selecting different parameters of the cell template;
c) realizing internal connections of the ring oscillator; and
d) generating an instantiated ring oscillator by replacing cell templates with corresponding basic units;

wherein at least some of the ring oscillators are part of addressable ring oscillator test chip that includes:

a plurality of ring oscillator test units;

a peripheral structure including peripheral circuits and Pads;

wherein the peripheral circuits share a first power source and a first grounding;

and wherein each test unit is associated with an independent power source to thereby decrease voltage drop resulting from wiring and to reduce influence from other test units; and where the step a) further comprises: defining pins at the cell template for the basic unit, and a corresponding search label of each pin; wherein the step d) further comprises: searching the corresponding pins based on the labels defined in the step a), ensuring coupling relations among the pins based on the equal-width paths and the constraining relations using the definition of path from c) and the constraints to ensure the connections between pins; and wherein the pins are configured to connect the basic units and have shapes of polygons.

11. The method of claim 10, wherein the generated variety of ring oscillators are configured for use in IC layout designs, including addressable ring oscillator test chip designs.

12. The method of claim 10, wherein the basic unit is: a standard unit having gate circuits or modules with a logic 'NOT' function and comprising one or more of: inverter (NOT gate), AND gate, OR gate, NAND gate, NOR gate, XNOR gate, XOR gate, AND-OR-NOT gate; or a nonstandard unit having gate circuits or modules with logic 'NOT' function and defined by user.

13. The method of claim 10, wherein prior to the step c), an oscillation structure of the generated ring oscillator is a same type as the basic unit for instantiation.

14. The method of claim 10, where the step c) further comprises:
realizing connections between cell templates or between a cell template and the oscillation structure with equal-width paths, and aligning the paths by using constraining relations.

15. The method of claim 1, wherein in the step a), the pins for the cell template are defined by using a location template.

16. The method of claim 14, wherein in the step c), the equal-width path is a type of basic layout structure for routings among the pins.

17. The method of claim 10, wherein in the step b), the oscillation structure of the generated ring oscillator is formed by different number of cell templates based on different selected parameters.

18. The method of claim 10, wherein the step d) further comprises generating different types of ring oscillators by using different types of basic units to replace cell templates.

* * * * *